United States Patent [19]

Hofstetter

[11] Patent Number: 4,557,877
[45] Date of Patent: Dec. 10, 1985

[54] LIQUID DISTRIBUTOR FOR AN EXCHANGE COLUMN

[75] Inventor: Josef Hofstetter, Wiesendangen, Switzerland

[73] Assignee: Sulzer Brothers Limited, Winterthur, Switzerland

[21] Appl. No.: 563,764

[22] Filed: Dec. 21, 1983

[30] Foreign Application Priority Data

Jan. 4, 1983 [CH] Switzerland ............................. 24/83

[51] Int. Cl.⁴ ............................................. B01F 3/04
[52] U.S. Cl. ...................................... 261/97; 239/450
[58] Field of Search ................... 261/97, 98, DIG. 44; 239/193, 450

[56] References Cited

U.S. PATENT DOCUMENTS

| 2,468,331 | 4/1949 | Hill et al. ............................. 239/450 |
| 3,290,025 | 12/1966 | Engalitcheff, Jr. ......... 261/DIG. 44 |
| 3,360,246 | 12/1967 | Eckert .................................... 261/98 |
| 3,392,966 | 7/1968 | Eckert .................................... 239/450 |
| 3,419,251 | 12/1968 | Eckert .................................... 261/98 |
| 3,440,018 | 4/1969 | Eckert .................................... 261/97 |
| 3,696,589 | 10/1972 | Liebig et al. ........................... 261/98 |
| 4,267,978 | 5/1981 | Manteufel .............................. 261/97 |
| 4,427,605 | 1/1984 | Meier et al. ........................... 261/97 |
| 4,444,696 | 4/1984 | Harper et al. ......................... 261/97 |

FOREIGN PATENT DOCUMENTS 1337771 11/1973 United Kingdom .................. 261/97

Primary Examiner—Tim Miles
Attorney, Agent, or Firm—Kenyon & Kenyon

[57] ABSTRACT

The liquid distributor is provided with a main channel, a plurality of secondary channels for receiving liquid from the main channel and a plurality of flow channels which extend laterally from each secondary channel in order to discharge liquid in the form of liquid streams. The flow channel permits a uniform distribution of the liquid across the cross-section of a mass transfer/heat exchange section of a mass transfer/heat exchange column. The flow channels may be in the form of downwardly bent tubes, downwardly angled tubes or troughs with downwardly directed tubes at one end or orifices at one end.

6 Claims, 7 Drawing Figures

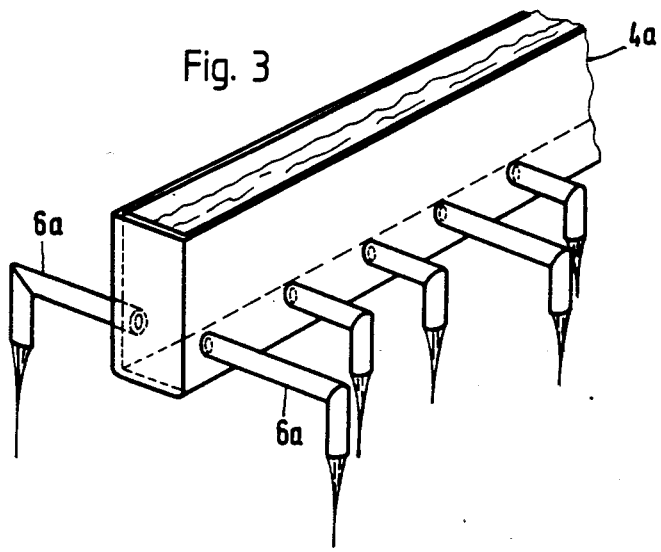
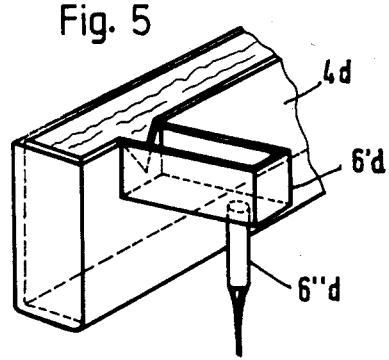
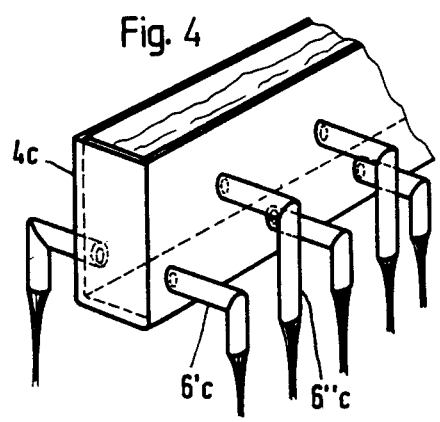

LIQUID DISTRIBUTOR FOR AN EXCHANGE COLUMN

This invention relates to a liquid distributor and particularly to a liquid distributor for a mass transfer or heat exchange column.

As is known, various types of exchange columns such as columns for mass transfer or for heat exchange have been provided with vertically arranged and spaced apart exchange sections. In some cases, the exchange sections are embodied by regular packings, such as fluted lamella-like elements. In other cases, the exchange sections have been embodied by statistical packings, such as Raschig rings or a group of vertical parallel channels. If the channels are of large diameter, such can be filled with statistical packings whereas, if the channels are narrow, the column takes the form of a so-called film column.

Columns of the above type can be used, for instance, for distilling, rectification, extraction, absorption, separation of isotopes by a chemical exchange reaction and heat exchange between a liquid and a medium in vapor or gas form.

Generally, the columns function so that a descending liquid is placed in a mass transfer relationship or heat exchange relationship with a rising vapor. The effect of the column, i.e. the separating effect in one case and the heat exchange effect in the other case, largely depends upon the liquid being divided uniformly and finely on the surface of an exchange or transfer section. To this end, it has been known to use various types of liquid distributors to distribute the liquid over an exchange section.

For example, one known distribution system embodies perforate or sieve trays formed with a large number of uniformly arranged orifices or perforated chimney trays having overflow systems. However, one disadvantage of such a system is that the system must cover a large proportion of the column crosssection if anything like a uniform liquid distribution is to be obtained over the whole of the cross-section. As a result, despite the existance of vapor chimneys and a gap which may be possible between the distributor and the wall of the column, the cross-section available for the passage of vapor is very limited. Hence, the pressure drop is high.

In order to improve on this known system, it has been suggested to provide lateral tubes. However, while this improves uniformity of liquid distribution, only a minor reduction in the substantial drop in gas pressure is achieved.

It has also been known to embody liquid distributors as a trough or box distributor formed with slots or V-incissions in the sidewalls for liquid to overflow or with capillary systems. Usually, the vapor pressure drop in such a liquid distributor is relatively low. However, these distributors have a great disadvantage that they must be fitted exactly horizontal. The slightest deviations from the horizontal together with wave movements or gradients in the flow direction of the liquid cause irregular distribution of the liquid and thus reduce the separating effect or heat exchange effect. Of note, the wave movements or gradients are the result of the flow of relatively large quantities of liquid in the channels of the distributor so that the channels cannot be made as narrow as would be desired.

It has also been known to construct a liquid distributor as a so-called box or tube distributor which is formed on the underside with orifices for the discharge of the liquid. Unfortunately, systems of this kind have the great disadvantage that the liquid can discharge only below the boxes or tubes. As a result, a large number of boxes or tubes must be provided to insure a fine distribution of the liquid. Hence, the pressure drop on the gas side is high and the system is of rather elaborate construction.

It has also been known from German Offenlegungsschrift No. 2 945 103 to construct a liquid distributor for counter-current column in the form of a groove or box distributor formed with orifices in the sidewalls for the liquid to flow through. In addition, the liquid is to be deflected downwardly by finger-like or beak-like deflectors such as described in French Patent Specification No. 703,029. However, this construction is not only very complicated but suffers from a number of disadvantages in operation. For instance, descending liquid can be detached from the edges of the fingers or tongues or the like by rising gas or vapor and can be entrained upwards thereby. Also, the liquid discharges from the tongues not as a stream but substantially as drops. Hence, if gas loads are heavy, the gas entrains the drops. There is also a risk that if gas loads are heavy, the outer fingers or tongues may vibrate in the gas flow and possibly be destroyed.

Accordingly, it is an object of the invention to provide a liquid distributor which is inexpensive to produce.

It is another object of the invention to provide a liquid distributor which can provide accurate liquid distribution over a column cross-section irrespective of gas or vapor loading considerations.

It is another object of the invention to provide a liquid distributor of relatively simple construction which provides a substantial improvement in column separating ability and heat exchange ability.

Briefly, the invention provides a liquid distributor which is comprised of a main channel for receiving a flow of liquid, a plurality of secondary channels which are disposed at spaced apart intervals and in communication with the main channel to individually receive a flow of liquid, and a plurality of flow channels which are connected to at least some of the secondary channels for removing liquid therefrom laterally and uniformly in the form of liquid streams.

In one embodiment, the flow channels which are connected to the secondary channels are in the form of tubes. In this respect, the tubes can be downwardly bent, for example in the form of L-shaped tubes.

In another embodiment, the flow channels may be formed by troughs which contain an orifice for the discharge of a liquid stream or a downwardly directed tube for discharging the liquid.

In still another embodiment, the flow channels may be disposed in vertically spaced rows along the length of a secondary channel. In addition, the flow channels may be of different lengths from the remainder of the flow channels in a given row.

In still another embodiment, the flow channels may be in the form of angled flow ducts which are secured to an underside of a secondary channel with each secondary channel having an orifice in an underside communicating with a respective flow duct.

These and other objects and advantages of the invention will become more apparent from the following detailed description taken in conjunction with the accompanying drawings wherein:

FIG. 3 illustrates a modified embodiment of a part of a liquid distributor constructed in accordance with the invention;

FIG. 4 illustrates a part of a liquid distributor employing multi-rows of flow channels extending laterally from a secondary channel in accordance with the invention;

FIG. 5 illustrates a part of a liquid distributor employing a flow channel in the form of trough;

Figure 1:
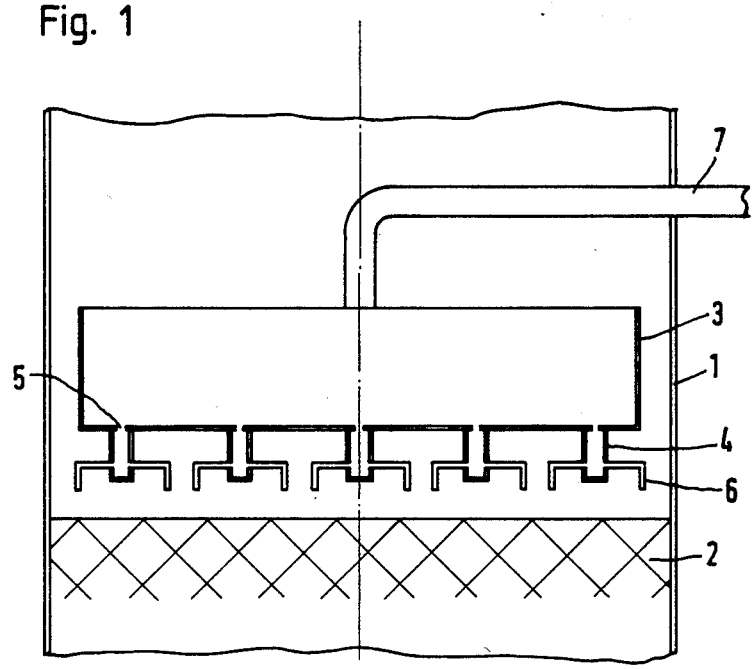
FIG. 1 illustrates a diagrammatic view of a part of a column having a liquid distributor according to the invention.

Referring to FIG. 1, a vertically disposed column 1 of circular cross-section employs at least one exchange section 2 for example for mass transfer. For example, the exchange section 2 may be in the form of a regular packing having an ordered structure. In addition, a liquid distributor is disposed above the exchange section 2 for distributing liquid over the exchange section 2. This liquid distributor is supported, for example on a grid or lattice or the like in a manner now shown.

Figure 2:
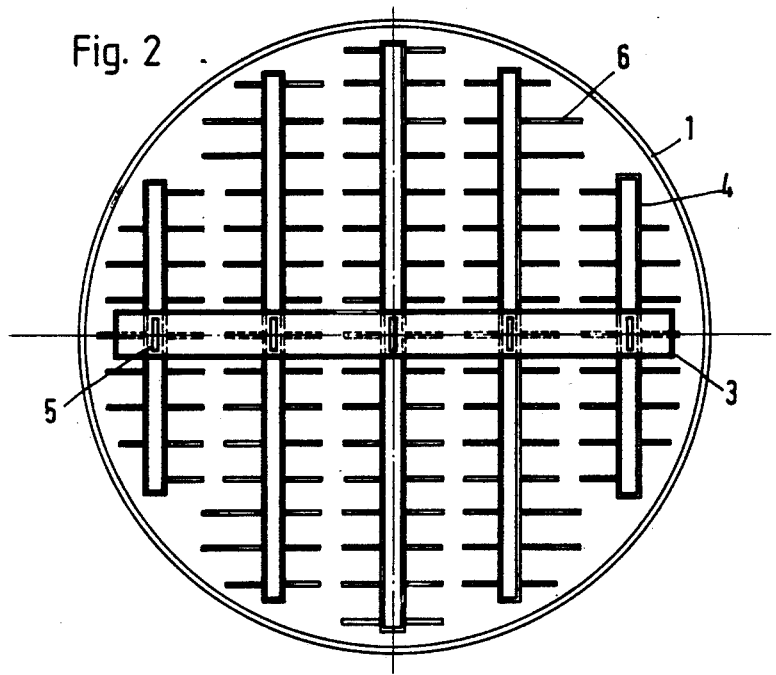
FIG. 2 illustrates a plan view of the column and liquid distributor of FIG. 1.

Referring to FIGS. 1 and 2, the liquid distributor includes an open primary or main channel 3 which is in the form of an elongated trough for receiving a flow of liquid from a suitable supply tube 7. In addition, the liquid distributor has a plurality of open secondary channels 4 disposed along the underside of the main channel 3 at spaced apart intervals. Each secondary channel 4 is in the form of a channel shape and is in communication with the main channel 3 via an orifice 5 in order to individually receive a flow of liquid therefrom. As indicated in FIG. 2, the secondary channels 4 extend laterally from the main channel 3 and extend over much of the cross-section of the column 1.

In addition, the liquid distributor includes a plurality of flow channels 6 which are connected to the secondary channel 4 for removing liquid therefrom laterally and uniformly in the form of liquid streams. As indicated in FIG. 2, the flow channels 6 are disposed on both longitudinal sides of the secondary channels 4. In addition, the flow channels 6 are of different lengths and take the form of downwardly bent narrow tubes. As indicated in FIG. 2, the flow channels 6 of the central secondary channel 4 are of equal length relative to each other along the opposite sides of the secondary channel. However, the flow channels 6 are of a longer length in the adjacent flow channels where the tubes 6 face the wall of the column 1.

In operation, liquid enters the main channel 3 through the supply tube 7 and flows through the main channel 3 into the secondary channels 4. Thereafter, the liquid is removed laterally from the secondary channels 4 via the tubes 6 and distributed uniformly in the form of liquid streams over the whole cross-section of the mass transfer section 2.

The liquid distributor is constructed so that a minimum number of secondary channels 4 are required. Hence, the vapor drop of the rising vapor flow from the exchange section 2 is reduced, that is, the vapor flows are increased.

The liquid distributor is of relatively simple construction so that initial installation costs can be held to a minimum.

Since exchange or transfer columns conventionally have a number of exchange or transfer sections separated from one another by spaces, collectors of known kinds are disposed in the spaces below the exchange or transfer sections. These collectors serve to guide the descending liquid into a liquid distributor which is disposed below each collector and above the next exchange section.

Referring to FIG. 3, the liquid distributor may be provided with flow channels $6a$ in the form of downwardly bent narrow tubes wherein the horizontal legs of the tubes are of different lengths from the adjacent tubes. The advantage of this construction is that the liquid can be guided to any required part of the column cross-section thus ensuring an accurately uniform distribution of the liquid.

Referring to FIG. 4, the liquid distributor may be provided with a secondary channel $4c$ which has multiple rows, i.e. two rows of flow channels extending laterally therefrom. As indicated, the rows are disposed one above the other and the flow channels are in the form of L-shaped narrow tubes $6'c$, $6''c$. In this case, the liquid throughput extends over a wide region.

Referring to FIG. 5, the liquid distributor may have a secondary channel $4d$ provided with horizontal flow channels in the form of the troughs $6'd$ which communicate with the secondary channel via a V-shaped slot. In addition, each trough $6'd$ can be provided with a vertically disposed tube $6''d$ connected to the underside near the end of the trough.

Figure 6:
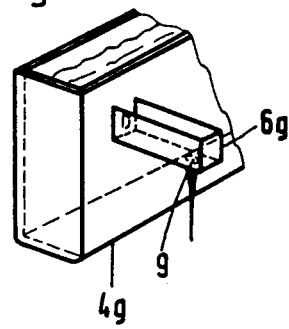
FIG. 6 illustrates a view similar to FIG. 6 of a modified trough in accordance with the invention.

Referring to FIG. 6, the liquid distributor may also be constructed so that a secondary channel $4g$ is provided with a flow channel in the form of a trough $6g$ which extends laterally and which communicates via an orifice in a wall of the secondary channel $4g$. As indicated, the orifice may be disposed at an intermediate height of the secondary channel $4g$. In addition, the trough $6g$ is provided with an orifice 9 in the underside near the end so as to deliver a liquid stream.

Figure 7:
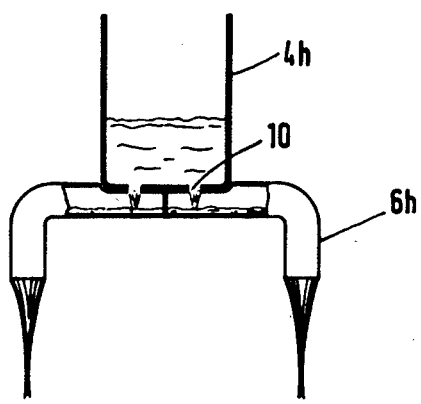
FIG. 7 illustrates a part cross-sectional view of a further modified liquid distributor in accordance with the invention.

Referring to FIG. 7, the liquid distributor may also be constructed with a secondary channel $4h$ which has pairs of orifices 10 in an underside, each of which communicates with an angled flow duct $6h$ which forms the flow channel. The flow duct $6h$ may be secured to the secondary channel $4h$ either by welding or by simply being pushed on.

In all of the above described embodiments, the secondary channels may additionally be provided with spaced apart orifices on the undersides through which liquid may discharge downwardly either directly or through tubes. These orifices would be in addition to the flow channels which are provided for the lateral distribution of the liquid.

The invention thus provides a liquid distributor which is of relatively simple construction and which is capable of a uniform distribution of a liquid across the cross-section of an exchange section.

Since the liquid distributor distributes the liquid in the form of liquid streams, the risk of small droplets of liquid becoming entrained in an upward flow of vapor is minimized. Further, because the liquid distributor presents a relatively small obstruction to the cross-section of a vertical column, the pressure drop across the distributor can also be at a minimum.

What is claimed is:

1. A liquid distributor for an exchange column comprising an open main channel for receiving a flow of liquid;

a plurality of secondary open channels disposed at spaced apart intervals and in communication with said main channel to individually receive a flow of liquid therefrom; and a plurality of flow channels connected to at least some of said secondary channels for removing liquid therefrom laterally and uniformly in the form of downwardly directed liquid streams, said flow channels being disposed in at least two rows one about the other and extending from at least one side of a respective secondary channel.

2. A liquid distributor as set forth in claim 1 wherein said flow channels are in the form of tubes.

3. A liquid distributor as set forth in claim 1 wherein said flow channels are in the form of troughs.

4. A liquid distributor as set forth in claim 1 wherein said flow channels are bent downwardly.

5. A liquid distributor as set forth in claim 1 wherein said flow channels are of different lengths.

6. In combination, a vertically disposed column having at least one exchange section; and a liquid distributor above said exchange section for distributing liquid uniformly over said exchange section, said distributor including an open main channel for receiving a flow of liquid; a plurality of open secondary channels disposed at spaced apart intervals and in communication with said main channel to individually receive a flow of liquid therefrom; and a plurality of flow channels connected to at least some of said secondary channels for removing liquid therefrom laterally and uniformly in the form of liquid streams onto said exchange section therebelow, said flow channels being disposed in at least two rows one about the other and extending from at least one side of a respective secondary channel.

* * * * *

UNITED STATES PATENT AND TRADEMARK OFFICE
CERTIFICATE OF CORRECTION

PATENT NO. : 4,557,877
DATED : December 10, 1985
INVENTOR(S) : JOSEF HOFSTETTER

It is certified that error appears in the above-identified patent and that said Letters Patent is hereby corrected as shown below:

Column 1, line 40 change "crossection" to –cross-section–

Column 3, line 15 change "Fig. 6" to –Fig. 5– (2nd Occ.)

Column 3, line 28 change "now" to –not–

Signed and Sealed this

Twenty-sixth Day of August 1986

[SEAL]

Attest:

DONALD J. QUIGG

Attesting Officer

Commissioner of Patents and Trademarks